United States Patent
Cherry

[11] Patent Number: 5,109,817
[45] Date of Patent: * May 5, 1992

[54] CATALYTIC-COMPRESSION TIMED IGNITION

[75] Inventor: Mark A. Cherry, San Diego, Calif.

[73] Assignee: Altronic, Inc., Girard, Ohio

[*] Notice: The portion of the term of this patent subsequent to Dec. 18, 2007 has been disclaimed.

[21] Appl. No.: 611,916

[22] Filed: Nov. 13, 1990

[51] Int. Cl.$^5$ .................. F02B 19/12; F02B 19/16
[52] U.S. Cl. ..................... 123/272; 123/266; 123/285; 313/143
[58] Field of Search ............ 123/254, 260, 266, 267, 123/268, 270, 271, 272, 282, 285; 313/143

[56] References Cited

U.S. PATENT DOCUMENTS

| | | | |
|---|---|---|---|
| 1,700,603 | 11/1927 | Vreeland et al. | 123/267 |
| 2,456,080 | 12/1948 | Pe | 123/266 |
| 2,520,378 | 8/1950 | Veit | 123/261 |
| 3,710,764 | 1/1973 | Jozlin | 123/267 |
| 3,741,175 | 6/1973 | Rouger | 123/48 A |
| 3,892,991 | 7/1975 | Joslyn | 313/143 X |
| 3,954,093 | 5/1976 | Hughes | 123/266 |
| 4,071,001 | 1/1978 | Goto | 123/267 |
| 4,218,993 | 8/1980 | Blackburn | 123/267 |
| 4,241,203 | 12/1980 | Lin-Liaw | 123/48 R |
| 4,319,552 | 3/1982 | Sauer et al. | 123/267 |
| 4,338,897 | 7/1982 | Drumheller et al. | 103/267 |
| 4,465,031 | 8/1984 | Bamer et al. | 123/260 |
| 4,499,399 | 2/1985 | Flores | 123/266 |
| 4,736,718 | 4/1988 | Linder | 123/267 |
| 4,834,042 | 5/1989 | Wakasa et al. | 123/271 |
| 4,898,126 | 2/1990 | Merritt | 123/272 X |
| 4,977,873 | 12/1990 | Cherry et al. | 123/266 X |

FOREIGN PATENT DOCUMENTS

| | | | |
|---|---|---|---|
| 0043622 | 7/1938 | Netherlands | 123/285 |
| 0455329 | 10/1936 | United Kingdom | 123/272 |

Primary Examiner—Willis R. Wolfe
Attorney, Agent, or Firm—William H. Maxwell

[57] ABSTRACT

A catalytic prereaction timing ignition method and igniter unit for timed ignition of a fuel-air mixture in internal combustion engines providing an ignition chamber open into the combustion chamber of the engine, there being a catalytic igniter positioned in the ignition chamber to intercept a pressure front of stratified fuel-air mixture penetrating a prechamber timing zone of the ignition chamber and controlled by the spring rate of burnt gasses captured in a buffer zone of the ignition chamber during the compression cycle and ignited by the pressure front touching the igniter to effect the power stroke of the engine.

35 Claims, 2 Drawing Sheets

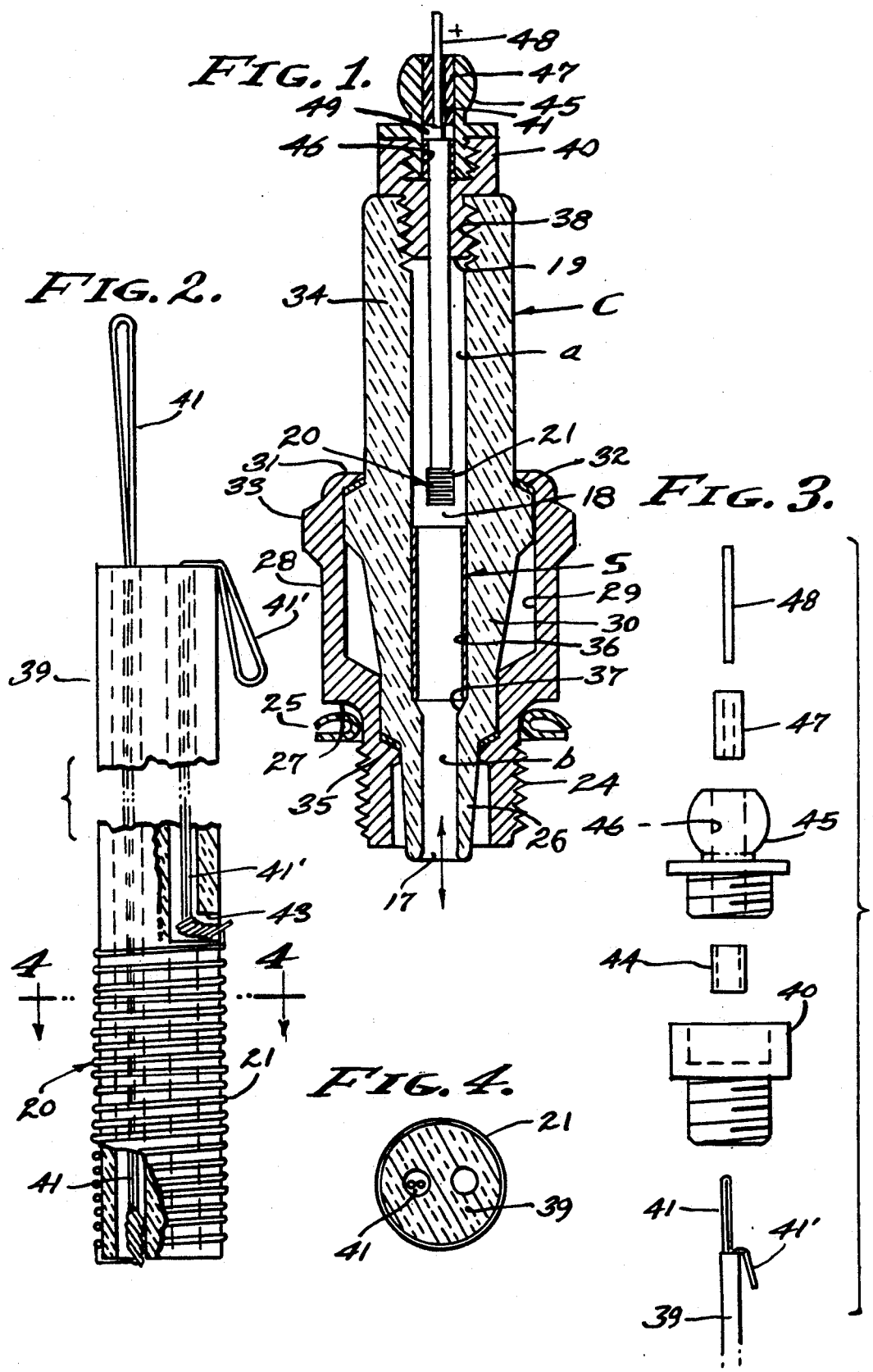

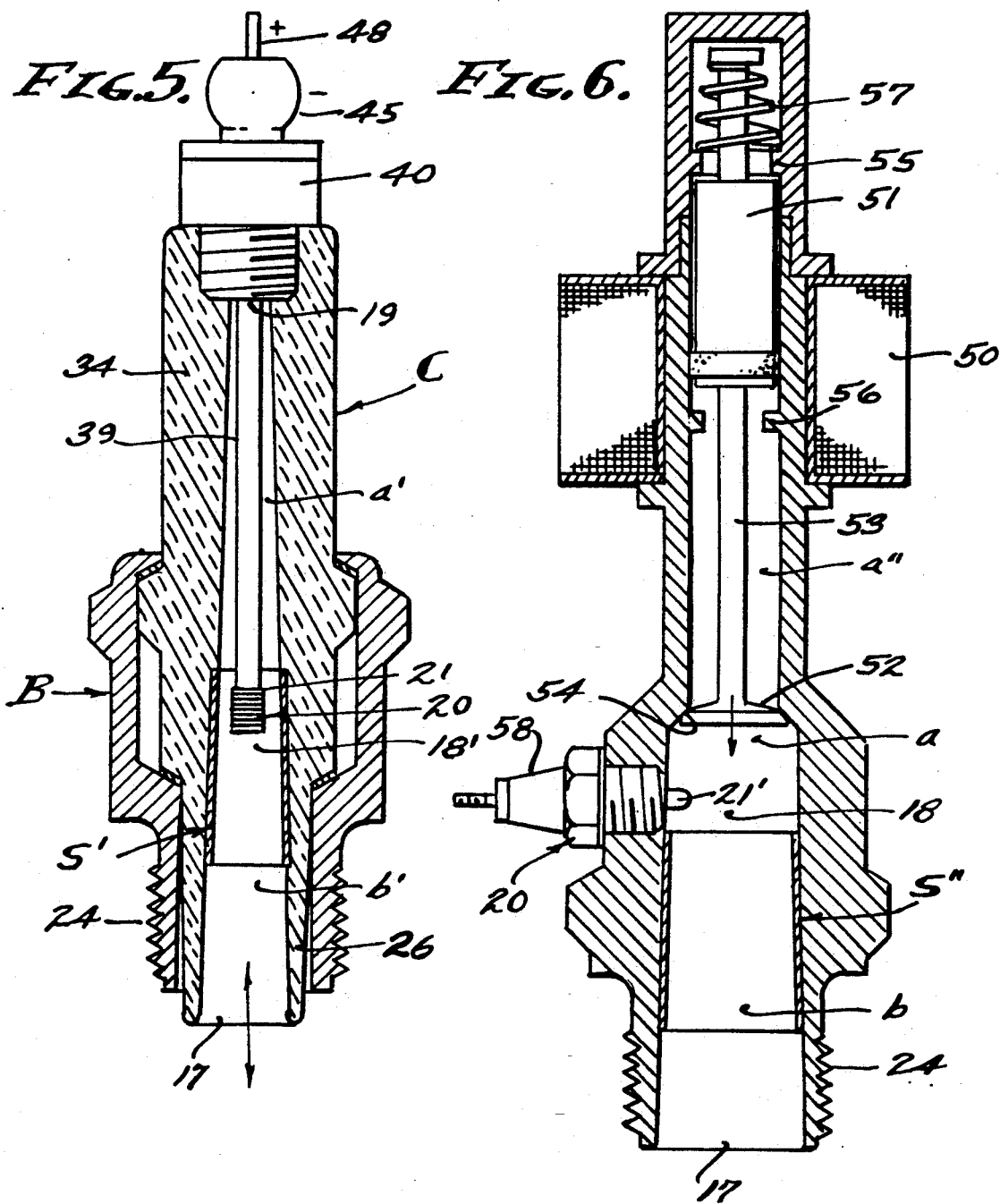

CATALYTIC-COMPRESSION TIMED IGNITION

This application is copending with application Ser. No. 07/363,523 filed Jun. 8, 1989, issued Dec. 18, 1990 as U.S. Pat. No. 4,997,873, entitled TIMING CHAMBER IGNITION METHOD AND APPARATUS.

BACKGROUND OF THE INVENTION

This invention relates to timing chamber ignition as it is disclosed and claimed in my U.S. Pat. No. 4,977,873 issued Dec. 18, 1990, entitled TIMING CHAMBER IGNITION METHOD AND APPARATUS. And, this invention is to be distinguished from prior art commutated high tension spark ignition systems. A characteristic feature of the Timing Chamber Ignition concept is the employment of a separate timing chamber and igniter means exposed therein, and all of which is in open communication with the combustion chamber of the engine. That is, a passageway enters the engine combustion chamber and openly communicates with a closed timing chamber having a timing zone into which a compressed fuel-air mixture pressure front penetrates during the compression cycle of the engine operation, and having a buffer zone that responds to said pressure front penetration as a gas spring, there being igniter means at a level or pressure front position corresponding to the point at which the ignition is required for optimum engine performance. The buffer function is variable, and the timing chamber displacement is adjusted and/or controlled for a particular engine performance, so that optimum ignition timing is established therefor. A feature is the response of the igniter means in the timing zone of the ignition chamber, to the fuel-air density as a result of throttle conditions. There is a gas shield effect at a stratified pressure front that precludes pre-ignition while inherently timing ignition in response to dynamic pressure conditions within the combustion chamber. Accordingly, this Timing Chamber Igniter Plug automatically adjusts to engine operating conditions. In practice, the igniter means is a heated element positioned where optimum ignition of the pressure front is to occur, the igniter means being electrically energized with a suitable low vehicle voltage. As shown, this Timing Chamber Igniter device has the external configuration of and resembles a conventional prior art spark plug. However, the internal features thereof are distinct from any spark plugs by the absence of any electrodes and by the provision therein of an ignition chamber and an igniter strategically placed therein.

Internal combustion engines employ the Otto spark ignition, carried out in various forms of engines which are recognized conventionally as either two cycle or four cycle, including reciprocating as well as rotary engines. This invention is particularly concerned with engines which employ compression to heat a combustible admixture of gas and air, followed by timed ignition thereof and heretofore produced by a high tension electrical discharge system with commutation to the multiplicity of spark plugs involved, and employing step-up coils, condensers and breaker points, all combined in a complex system using both low and extremely high voltage electricity. Thus, the prior art has resorted to complex and expensive means, all of which is eliminated and replaced by the simple relatively inexpensive Igniter unit herein disclosed. It is a general object of this invention to provide a commercially practical and improved ignition plug of the type under consideration, to replace the conventional spark plug configuration without any change or modification to the engine, except to remove uneeded systems as suggested above.

The ignition system herein disclosed is universally applicable to internal combustion Otto cycle engines of all types. That is, this ignition system is operable in carbureted or atomized fuel injected Otto cycle engines, regardless of the type of fuel employed, providing a stoichiometric ratio of fuel to air exists that will support combustion. Therefore, it is a primary object of this invention to provide an igniter plug with improved and durable igniter means for timed ignition of internal combustion engines, and by providing igniter means maintained within a temperature range that ensures ignition of the fuel-air mixture without misfiring. A feature of the igniter means is that an ignition element in the form of a high temperature heater is suspended in the timing chamber spaced at the juncture between the timing zone and the buffer zone, as will be described. In present practice the heater is maintained within a temperature range of approximately 1000° to 2000° F. for predictably optimum results with presently available fuels. Responsive ignition by the heater normally occurs before top dead center of the engine crank motion, by touching a stratified pressure front from said compression mixture brought into contact with said high temperature heater.

With this invention, there is progressive movement of the pressure front into the closed chamber, preferably an elongated ignition chamber that is penetrated by the pressure front to the position of the igniter means. At this pressure front level and/or position within the closed chamber, ignition occurs and projects a torch into the engine chamber, it being an object of this invention to control pressure front penetration by changing or varying the spring rate of the buffer zone. Volume of the buffer zone is a primary factor that determines pressure front penetration, and the cross sectional area along the buffer zone is a controlling factor. In practice, the buffer zone is a continuation of the timing zone and is basically of a fixed volume. The gas spring formed thereby has the elastic effect of the gas or gasses that are compressed, these gasses responding according to their displacement ahead of the penetrating pressure front. Therefore, the cross sectional area of the timing zone (also of the buffer zone) is varied as by being tapered so as to augment or to diminish the spring rate as may be required. It is also an object of this invention to vary timing chamber volume by valve means, for example by a solenoid operated valve means.

This timing chamber igniter unit as it is disclosed herein is conductive to operation with lean fuel-air mixtures, which heretofore have been regarded as unworkable. That is, the conventional stoichiometric ratio can be reduced from the usual 14 to 1 ratio to a far leaner mixture which otherwise would destroy conventional spark plugs. With the present invention however, the penetrating stratified pressure front of leaner mixture touches the igniter means heater and following which flame torch progression is toward and emanates into the engine combustion chamber. In accordance with this invention, the igniter means heater is fabricated of a noble metal having catalytic properties such as Platinum, Paladium or Rhodium. These catalysts speed up and enhance the chemical oxidation process of burning the fuel-air mixture without consuming themselves, which ensures a long igniter life. However, the use of such noble metal for the heater does not preclude the use of less expensive materials such as nickle chrome wire and the like, when requirements permit.

As thus far described it will be observed that this invention involves a dyamic timing catalytic ignition (DTCI) system, devoid of the conventional spark ignition. Accordingly, it is an object of this invention to provide prechamber catalytic enhancement of the combustible mixture combined with compression timed ignition, inherently devoid of other mechanical or electrical timing means.

It is an object of this invention to intensify instantaneous ignition by means of a compression responsive igniter. To this end a catalytic prechamber is employed in combination with a compression responsive timing chamber. A feature is a timing chamber wherein a catalyst is placed so as to enhance the gas ignition phase and burning of the remaining mixture in the engine combustion chamber. This is accomplished by a powerful flame torch which emanates from the timing prechamber. Heretofore, catalytic prechambers have been unable to time ignition per se, so that Otto cycle engines have relied upon spark ignition, and Diesel cycle engines have relied upon timed fuel injection. However, the catalytic prechamber concept has advantages and is compatible with the timing chamber ignition concept of my aforesaid U.S. Pat. No. 4,977,873. Accordingly, the timing chamber herein disclosed includes prechamber features in the form of a catalytic element of noble metal over or through which the stratified combustible mixture pressure front penetrates on its excursion to the igniter means. Again, the igniter means is a heater preferably of a noble metal as above specified, preferably Platinum.

The catalytic ignition concept is suited to the ignition of conventional and presently available premixed high octane fuels. A high temperature, homogeneous charge environment consisting of gasoline and air is naturally well suited to in-cylinder catalytic treatment and a catalytic prechamber is attractive from the standpoint of controlling all phases of in-cylinder combustion. Such a prechamber influences both chemical and gas dynamic processes; it regulates contact between the fresh charge and the catalytic element; it allows activation to take place in a well defined volume open to the igniter means; it provides means to control catalytic surface temperature; and it intensifies burning of the non-activated portions of the mixture.

To understand the potential of catalytic activation as a means of enhancing gas phase combustion requires understanding the roles of species and thermal activation. This distinction is complicated by the fact that hot products leaving the catalytic surface promote homogeneous production of the same chain-branching species that might be attributed to species activation. The theory of catalytically assisted homogenous combustion framed here is based on thermal activation principles. Catalytic combustion can be modeled as two distinct processes. The first is catalytic surface reaction and the ensuing diffusion of radicals as well as heat into the homogeneous phase. The second is the effect of these reaction by-products on the combustive properties of a gaseous hydrocarbon mixture. In as much as catalytic reaction is mass transfer limited, surface reaction rates can be estimated by well established mass transfer correlations. As to the effect of thermal activation, Heterogeneous catalysis is unique in its ability to selectively oxidize hydrocarbon mixtures to final reaction products and to thermally activate the remaining charge in the surrounding gas phase. Note that in non-catalytic systems it is nearly impossible to bring about controlled prereaction. Empirical observation has shown that thermal activation by catalytic prereaction will provide a twofold increase in flame velocity and a 50% reduction in ignition energy requirements, when observed under reasonably adiabatic conditions. Even with a 50% heat loss, flame velocities are 25% higher than with no catalytic prereaction. Thus, thermal activation by hetrogeneous catalysis bolsters the laminar flame velocity and reduces the required ignition energy and is most useful.

It is an object of this invention to concentrate the effects of catalysis in a relatively small volume timing prechamber responsive to a stratified pressure front of combustible mixture. The timing prechamber serves to activate only a small portion of the total mixture under compression. Ignition and burning of the total mixture is achieved by a powerfull flame torch which emanates at the igniter means heater and from the timing prechamber opening into the combustion chamber. This gas dynamic function brings about complete combustion of the total mixture including the unactivated portion thereof.

Heat dissipation is a factor to be considered in the manufacture of this Igniter unit, much the same as is the heat range control a major consideration in the spark plug art. That is, the deciding factor in the choice of proper spark plugs is the thermal value, which is controlled by the ceramic insulator design and its relation to the metalic body threaded into the combustion chamber of the engine. Although the Igniter unit of the present invention is not subject to critical spark gap problems, ignition temperature is of some concern so that pre-ignition will not occur. To this end the igniter means of the present invention is thermally isolated from the surrounding structure of the timing chamber, and the timing chamber passage is comprised of a structure that is isolated from the body of the unit. In practice, the timing prechamber and passage structure is a heat isolating insulator of ceramic material that also dissipates heat. As a result, passage temperature is held below 600° F. for example, while igniter means temperature ranges from 1000° to 2000° F. Accordingly, it is an object of this invention to control internal heat conditions and to dissipate heat absorbed from the combustion process, so as to preclude pre-ignition and to ensure the timed ignition which is inherent with the use of this timing pre-chamber and igniter means. Another feature of this invention is the heat insulating dielectric rod that carries the igniter means heater, an object being to isolate this heater from the surrounding unit structure.

The foregoing and various other objects and features of this invention will be apparent and fully understood from the following detailed description of the typical preferred forms and applications thereof, throughout which description reference is made to the accompanying drawings.

THE DRAWINGS

FIG. 1 is a vertical cross sectional view showing the Igniter of the present invention as a plug component of unit form.

FIG. 2 is an enlarged elevation of the igniter means removed from the chamber structure, portions thereof broken away in section.

FIG. 3 is an exploded view of the electrical connections to the igniter means.

FIG. 4 is a sectional view taken as indicated by line 4—4 on FIG. 2.

FIG. 5 is a view similar to FIG. 1, and shows a second embodiment wherein the timing prechamber is tapered to control a buffer zone thereof.

And, FIG. 6 is a third embodiment wherein the buffer zone is controlled by solenoid means to alter the compression response of the buffer means.

PREFERRED EMBODIMENT

This invention provides a method of catalytic prereaction compression timed internal combustion engine ignition, without the use of conventional high tension spark ignition and its complexities. This method comprises a first step of providing a closed ignition chamber with a timing prechamber zone exposing a catalyst and having an entry passage from the combustion chamber of the engine and with a buffer zone in open communication with the timing prechamber zone and extending away from the entry passage; a second step of exposing an igniter means at a position where the timing prechamber zone and buffer zone are in open communication; a third step of transferring a stratified pressure front comprised of a combustible fuel-air mixture from the combustion chamber of the engine and through the entry passage so as to penetrate through the timing prechamber zone for prereaction during the compression cycle of the engine; a fourth step of capturing a determined volume of gasses in the buffer zone as an elastic medium to react in equilibrium with the pressure of gasses in the combustion chamber, as a spring; and the fifth step of depressing the captured buffer zone gasses with the penetrating pressure front of stratified prereactive combustible fuel-air mixture for contact thereof with the igniter means; whereby ignition of the statified prereactive combustible fuel-air mixture is initiated by and at the igniter means and emanates as an intensified torch flame from the timing prechamber and into the combustion chamber of the engine to effect the power cycle thereof.

This method is performed during the operation of Otto cycle engines, most common of such engines being the gasoline engine having a piston moving with a crank shaft to compress an inducted fuel-air mixture into a closed combustion chamber. Retraction of the piston during the intake cycle causes a partial vacuum that is reversed to positive pressure progressively increasing during the compression cycle, whereby a stratified compression front is increased to a peak compression.

The first step of providing the closed ignition chamber exposes the fuel-air mixture within the combustion chamber to a separate closed and elongated chamber, whereby the stratified pressure front of combustible fuel-air mixture progressively penetrates the entry passage and into and through the timing prechamber zone of the ignition chamber. In accordance with this method, the prereaction catalyst is exposed within the timing prechamber ahead of the igniter means placement, preferably a deposite of or lining of noble metal such as Platinum or the like, maintained at a temperature substantially less than the ignition point of the fuel-air mixture. For example, at about 1000° F. less than the ignition point, or at about 800° F. In practice, the volume of the ignition chamber is fixed or variable, as will be described.

The second step of exposing the igniter means involves the placement thereof in the form of a heater at a determined depth of penetration into the ignition chamber timing prechamber zone. The required placement can be empirically determined and carried out by observation and experience, and is performed by positioning a heater element, preferably of heated cataytic material, at a depth in the timing prechamber zone of the ignition chamber, to attain the engine performance desired. In accordance with this method, the igniter means or heater is placed centrally in the ingition chamber at the juncture between the timing prechamber zone and the buffer zone, preferably a filament of noble metal such as Platinum or the like maintained at or above the ignition point of the fuel-air mixture. For example, electrically energized to 1000° F. to 2000° F.

The third step of transferring the stratified pressure front of combustible fuel-air mixture into the ignition chamber is preformed by providing open communication from the combustion chamber of the engine and into and through the timing prechamber zone of the ignition chamber, for exposure to the catalyst and prereaction thereof.

The fourth step of capturing a determined volume of gasses in the buffer zone of the ignition chamber involves a dead air space in which burnt gasses are alternately compressed and depressed in equilibrium with gas pressure changes in the combustion chamber of the engine. Essentially therefore, the burnt gasses captured in the buffer zone react as a spring of noncombustible gasses that occlude the igniter means when subjected to reduced pressures and thereby extended, and that alternately exposes the igniter means to the pressure front of combustible fuel-air mixture when subjected to peak compression pressures of said combustible fuel-air mixture. Accordingly, the captured buffer zone gasses react as an elastic spring to control ignition timing in response to gas pressures as they prevail in the combustion chamber of the engine.

The fifth step of depressing the buffer zone gasses is performed in response to the compression cycle of the engine and progresses until the stratified pressure front of the combustible fuel-air mixture reaches the igniter means heated to ignition temperature, and placed and exposed according to the second step, at which time ignition of the prereactive admixture of fuel-air is instantaneous in the form of an intensified torch flame progressing centrally from the igniter means or heater and emanating through the open ignition chamber and into the engine combustion chamber to thermally activate the non-preactive portion of the compressed fuel-air mixture.

Referring now to a typical reciprocating engine (not shown) a piston operates in a cylinder and is coupled to a crank shaft by a connecting rod. There is usually an intake valve into a combustion chamber at the top end of the cylinder, and an exhaust valve therefrom. The characteristic requirements for such an engine is means for intake of a fuel-air mixture, means for effecting a compression cycle followed by a power cycle, and means for exhaust, and that there be a fuel-air mixture compression cycle followed by a power cycle.

In accordance with this invention, an entry passage opens into the combustion chamber of the engine to receive the stratified pressure front of the fuel-air mixture during the compression cycle. In practice, the size of this entry passage is relatively small, preferably an opening of 0.125 inch diameter so as to have little effect upon the engine compression ratio, and which has performed well in moderate sized automotive engines. In practice, the entry passage 17 is positioned where a spark plug might otherwise occur. And, an ignition chamber 18 continues from and is in open communication with the entry passage 17, a closed chamber blind at its deepest end or top 19. In practice, the ignition chamber 18 is an elongated tube of smooth uniform or tapered diameter, emanating at the entry passage 17 into the engine combustion chamber. A feature of this invention is the igniter means 20 exposed within the ignition chamber 18, and which is maintained at an ignition temperature of the fuel-air mixture to be ignited thereby, and is located intermediate the entry passage 17 and the top 19 of the ignition chamber. As shown in FIGS. 1-5 of the drawings, the igniter means 20 is a rod that enters the ignition chamber 18 through the top 19 thereof, with its heater element 21 exposed centrally within the ignition chamber. Electrical voltage is applied through least one and preferably two conductors. A feature is that the heater element 21 is a catalyst made of Platinum or the like, so as to actively ignite the stratified pressure front of the fuel-air mixture that moves into contact therewith when peak compression is reached or approached in the engine combustion chamber.

Referring now to FIGS. 1-3 of the drawings, the first embodiment of this invention has the configuration of a state of the art spark plug, so as to be a replacement thereof. Accordingly, the igniter is a unit that includes a body B having a reach section 24 threaded for reception into the cylinder head of a usual engine, there being a shoulder and a compressible seal to prevent gas leakage. And, the igniter unit also includes an elongated chamber section C extending coaxially from said body B. Although the body B and chamber section C can be integrally formed of a single metallic piece, it is preferred to form the chamber section as a separate heat controlling member, and of a configuration to control heat dissipation. In practice, heat control is by means of a ceramic chamber section C, following state of the art practice which is highly developed in the spark plug art. Accordingly, the threaded portion of the body B reach section 24 is a metalic tubular member and through which the lower tubular end 26 of the ceramic chamber section extends so as to be exposed to and open into the engine combustion chamber. The body B is characterized by a downwardly faced shoulder 27 to engage the seal 25, and has an upstanding cylinder portion 28 of tube form counterbored at 29 to receive the base 30 of the ceramic chamber section C, and over which the top periphery of the body is crimped or roll-formed onto a shoulder of the base as at 31. A pressure seal 32 is intalled to seal this joint. The top periphery of the body B has a hexagonal drive portion 33 as is indicated, ands the chamber section C has an upper tubular end 34 that projects upwardly from the body B. The total length of this body and chamber combination can be about two inches, more or less.

Referring now to the functional features of this igniter unit, the body B and its section 24 provide the normally required adaptation to the cylinder head of the internal combustion engine to be ignition timed thereby. The chamber section C includes and/or carries the prechamber and compression timing features now to be described. The chamber section C is preferably pressure molded of alumina and fired with a suitable glaze, so as to have a smooth surface conductive to cleaning. However, a metalic chamber section can be employed if desired, since dielectric properties are not a primary requirement here.

The chamber section C is secured to and centered by a seal 35 in the counterbore 29, and is characterized by the ignition chamber 18 substantially coextensive therewith and open at the lower tubular end 26 and is closed at the upper tubular end 34. The total length of the ignition chamber 18 therein is about 1.75 inch and is of the aforesaid 0.125 diameter cross section within the lower tubular portion - reach zone of body B. In practice, the chamber section C is counterbored at 36 to a slightly larger diameter, providing a step at 37 to retain a catalyst sleeve as will be described. The upper terminal end portion of the chamber section is internally threaded at 38 to receive a carrier 40 of the igniter means 20. Thus, the body of the igniter unit is comprised of one or two members and characterized by a threaded connection into the engine cylinder head and by the elongated ignition chamber 18 that opens into the combustion chamber.

Referring now to FIGS. 2-3 of the drawings, the igniter means 20 is a rod 39 of dielectric material that carries the filiment or heater element 21 at the juncture between the buffer zone a and the prechamber timing zone b. It is at this juncture that the stratified pressure front of combustible fuel-air mixture touches the heater element 21 when the engine compression is at a value for the desired and/or optimum, engine performance. The rod 39 is preferably pressure molded of alumina and fired so as to form a durable insulation through which conductive leads 41 and 41' extend to the heater element 21, for example a 4 in. coil of 0.005 inch diameter platinum wire. Such a wire is operable on 12 Volts at 2 amps. In practice, the rod 39 is 0.062 inch diameter with a pair of coextensive conductor holes of 0.064 inch diameter. The heater element 21 is carried on the lower end portion of the rod 39, the rod varying length according to the compression requirements of the engine involved. In practice, the rod will be more or less about one inch long.

The heater element 21 is shown as a coil of approximately twenty turns of 0.005 wire wrapped onto the lower terminal end portion of the rod 39. One conductor 41 thereto emanates from one conductor hole at the lower terminal end of the rod and continues into the coil thereof wound upwardly to an opening 43 through the side of the rod and into the other conductor hole to receive the second conductor 41' therethrough. The two conductors 41 and 41' emanate from the top terminal end of the rod in the form of separate loops or wire doubled back through their respective conductor holes in the ceramic insulating rod and run parallel to and wrapped with the conductors 41 and 41' adjacent to the resistance coil to increase the current carrying capacity thereof. Accordingly, only the coil element 21 is raised to ignition temperature of 1000° F. to 2000° F., one continuous wire.

Installation of the igniter means 20 will be clear form FIGS. 1-3 of the drawings, showing the carrier 40 through which the top end portion of the rod 39 extends, with the loop of conductor 41 projecting upwardly and with the loop of conductor 41' turned downwardly (see FIG. 3) when the carrier 40 is threaded at 38 into the chamber section C. A conductor sleeve or wrapping of foil 44 is placed over the conductor loop 41' and constricted by a terminal plug 45 threadedly engaged to the carrier (see FIG. 1). The terminal plug 45 has a bore 46 to constrict onto the conductive foil 44 and to receive an insulator sleeve 47 that carries a terminal pin 48 force fitted over the loop of conductor 41. A sealing compound or cement or the like is applied at 49. The plug and pin teminals 45 and 48 are coupled into an electrical circuit as indicated.

The first embodiment shown in FIG. 1 of the drawings employs a straight cylindrical ignition chamber 18, with the step at 37 to retain a catalytic sleeve S or to accomodate a catalytic deposite, without decreasing the (0.125 in.) area of the entry passage 17. A feature is that the increased (0.156 in.) diameter of the counterbore 36 establishes an annulus surrounding the igniter rod 39, an annulus substantially equal in cross sectional area to the area of the passage 17. Accordingly, the ignition chamber 18 is of substantially uniform cross section, top to bottom. The catalytic sleeve or deposite S is a tubular lining of the aforesaid noble metal such as Platinum or the like that provides the prechamber function by re-reacting with the stratified pressure front of combustible mixture of gases penetrating to the ignition zone. The timing prechamber zone b is in open communication with the buffer zone a and with the heater element 21 positioned coaxially within the ignition chamber 18 at the ignition zone juncture between zones a and b.

The second embodiment shown in FIG. 5 of the drawings differs from the first embodiment in its ignition chamber 18' configuration and placement of the prechamber catalyst S'. A feature of this embodiment is the tapered shape or configuration of chamber 18', whereby the spring rate in the buffer zone a' is controlled. By gradually reducing the cross sectonal area progressively toward the top 19, resistance is increased in the elastic cushion that retards the excursion of the stratified pressure front in reaching the heater element 21. In practice, capture of previously burnt gases extends to the opening of passage 17 at the lowermost end of the ignition chamber 18' (18), so that the stratified compression front of combustible fuel-air mixture begins its spring compression function as it enters the lowermost opening of passage 17. Accordingly, the continuing tapered configuration of zone a' into zone b' provides the elastic spring function coextensively of ignition chamber 18' (18).

The prechamber catalyst S' of the second FIG. 5 embodiment is positioned above the passage 17 and also surrounds the vertical extent of heater element 21. Accordingly, the prereaction at reduced temerature of the aforesaid noble metal such as Platinum or the like is transformed into a full reaction combustion phase at high ignition temperature surrounding the heater element 21.

The third embodiment shown in FIG. 6 of the drawings provides external control of the elastic spring function of the ignition chamber 18". As shown, there is a secondary buffer zone a", in addition to the above described buffer zone a (a') and timing prechamber zone b (b'). A feature is the isolation of secondary buffer zone a" for engine operation under a first predetermined condition, and to open communication of the secondary buffer zone a" with the aforesaid buffer zone a (a') for engine operation under a second predetermined condition. As shown, there is a solenoid comprised of a surrounding field coil 50 and an internal armature 51 shifted axially when the coil is electrically energized. A poppet valve 52 operated by a stem 53 coupled to the armature 51 engages a seat 54 that separates buffer zone a" and a (a'). Stops 55 and 56 limit movement of the armature-stem-valve assembly, and a spring 57 normally seats the valve so as to isolate the two buffer zones. As shown, the heater element 21' is that of a glow plug 58 that enters through the side wall of the igniter at the juncture of the buffer zone a (a') with the timing prechamber b (b') lined with a catalytic sleeve or coating S".

Having described only the typical and preferred forms and applications of my invention, I do not wish to be limited or restricted to the specific details herein set forth, but wish to reserve to myself any modifications or variations that may appear to those skilled in the art, as set forth within the limits of the following claims.

I claim:

1. A method of catalytically enhanced ignition in internal combustion engines having a compression cycle and ignition of a combustible fuel-air mixture in a combustion chamber followed by a power cycle, and including;

the first step of providing a closed timing prechamber with a catalyst therein and in open communication with the combustion chamber for penetration therein of a stratified pressure front of the combustible fuel-air mixture, the second step of positioning an igniter means at a depth of the stratified pressure front penetraton of said combustible fuel-air mixture into the closed timing prechamber for contact therewith at a determined compression of said combustible fuel-air mixture in the combustion chamber, the third step of transferring the stratified pressure front of combustible fuel-air mixture from the combustion chamber and into contact with the catalyst in the timing prechamber during the compression cycle and preactivating the same, the fourth step of capturing a volume of previously burnt noncombustible gasses in the closed chamber for occlusion of the igniter means and for depression as a spring, and the fifth step of depressing said captured previously burnt non combustible gasses with the penetrating stratified pressure front of activated combustible fuel-air mixture until contact thereof with the igniter means, whereby an ignition phase occurs in the form of a flame emanating into the combustion chamber for continued burning to effect the power cycle and leaving burnt noncombustible gasses in the closed timing prechamber.

2. The method of catalytic enhanced ignition in internal combustion engines as set forth in claim 1, wherein the first step is performed by providing the timing prechamber with a timing zone in open communication with the combustion chamber and a buffer zone in open communication with the timing zone and capturing said burnt noncombustible gasses as a spring.

3. The method of catalytic enhanced ignition in internal combustion engines as set forth in claim 1, wherein the second step is performed by maintaining an ignition temperature of said combustible fuel-air mixture in the igniter means.

4. The method of catalytic enhanced ignition in internal combustion engines as set forth in claim 2, wherein the second step is performed by positioning the igniter means at an ignition zone in open communication between the timing zone and the buffer zone.

5. The method of catalytic enhanced ignition in internal combustion engines as set forth in claim 2, wherein the third step is performed by entering the stratified pressure front of combustible fuel-air mixture into the timing zone in equilibrium with non combustible gasses therein.

6. The method of catalytic enhanced ignition of internal combustion engines as set forth in claim 2, wherein the fourth step is performed by entering the stratified pressure front of combustible fuel-air mixture into the timing zone in equilibrium with non combustible gasses depressed thereby as a spring in the buffer zone.

7. The method of catalytic enhanced ignition in internal combustion engine as set forth in claim 3, wherein the fifth step is performed by depressing the gasses in both the timing zone and the buffer zone for entry of the stratified pressure front of combustible fuel-air mixture and its penetration to the igniter means for ignition in response to combustion chamber pressure.

8. The method of catalytic enhanced ignition in internal combustion engines as set forth in claim 1, wherein the third step is performed by maintaining the catalyst therein below the ignition temperature of said combustible fuel-air mixture and at a sufficient temperature to preactivate said mixture.

9. The method of catalytic enhanced ignition in internal combustion engines as set forth in claim 1, wherein the first step is performed by providing the timing prechamber with a timing zone in open communication with the combustion chamber and a buffer zone in open communication with the timing zone and capturing said burnt noncombustible gasses as a spring, wherein the second step is performed by maintaining an ignition temperature at and above the ignition point of said combustible fuel-air mixture and in the igniter means, wherein the third step is performed by entering the stratified pressure front of combustible fuel-air mixture into the timing zone in equilibrium with noncombustible gasses therein and by maintaining the catalyst therein below the ignition temperature of said combustible fuel-air mixture and at sufficient temperature to preactivate said mixture, wherein the fourth step is performed by depressing said captured combustible gasses as a spring, and wherein the fifth step is performed by depressing the gasses in both the timing zone and the buffer zone for entry of the stratified pressure front of combustible fuel-air mixture and its penetration to the igniter means for ignition in response to combustion chamber pressure.

10. The method of catalytic enhanced ignition in internal combustion engines as set forth in claim 1, wherein the first step is performed by providing the timing prechamber with a timing zone in open communication with the combustion chamber and a buffer zone in open communication with the timing zone and capturing said burnt noncombustible gasses as a spring, wherein the second step is performed by positioning the igniter means at an ignition zone in open communication between the timing zone and the buffer zone, wherein the third and fourth steps are performed by entering the stratified pressure front of combustible fuel-air mixture into the timing zone in equilibrium with noncombustible gasses depressed thereby as a spring in the buffer zone, and wherein the fifth step is performed by depressing the gasses in both the timing zone and the buffer zone for entry of the stratified pressure front of combustible fuel-air mixture and its penetration to the igniter means for ignition in response to combustion chamber pressure.

11. An igniter for timing chamber ignition in internal combustion engines having a combustion chamber, means for intake of a combustible fuel-air mixture, means for effecting a compression cycle followed by a power cycle, and means for exhaust of burnt gasses, and including;

an elongated ignition chamber means comprised of a timing zone with an entry passage in open communication with the combustion chamber and a buffer zone continuing from the timing zone and with a closed end to capture gasses therein, igniter means comprised of a rod carried by the closed end of the ignition chamber means and having a heater element exposed within the ignition chamber means between said entry passage and said closed end for ignition af a stratified pressure front of said combustible fuel-air mixture penetrating into the ignition chamber during the compression cycle, the ignition chamber means being closed by said end to capture burnt gasses therein so as to function as a spring opposed to the pressure front of said combustible fuel-air mixture, whereby burnt gasses occlude the heater element until contacted by the penetrating stratified pressure front of combustible fuel-air mixture for ignition thereof and transfer of a flame into the combustion chamber to effect the power cycle.

12. The igniter for timed engine ignition as set forth in claim 11, wherein the ignition chamber means is a ceramic of tubular cross section carried by a metalic body adapted to the engine combustion chamber.

13. The igniter for timed engine ignition as set forth in claim 11, wherein the ignition chamber means is a ceramic heat control means of tubular cross section carried by a metalic body adapted to the engine combustion chamber.

14. The igniter for timed engine ignition as set forth in claim 11, wherein the ignition chamber means is a ceramic heat control means of tubular cross section carried by and projecting from a metalic body screw threaded into the engine for exposure into the combustion chamber.

15. The igniter for timed engine ignition as set forth in claim 11, wherein the igniter means rod is a ceramic insulator carrying electrical conductors from the heater element for access externally of the ignition chamber means.

16. The igniter for timed engine ignition as set forth in claim 11, wherein the heater element is a wire wrapped onto an end portion of the rod and with conductors therefrom carried by the rod and exposed therefrom for access exteriorly of the ignition chamber means.

17. The igniter for timed engine ignition as set forth in claim 11, wherein the heater element is a wire wrapped ont a lower end portin of the rod and with a pair of conductors therefrom carried through complementary holes extending through the rod to emanate therefrom for access externally of the ignition chamber means.

18. The igniter for timed engine ignition as set forth in claim 11, wherein the heater element is exposed at a lower end portion of the rod with a pair of conductors emanating at a top of the rod supported by a bore through a carrier secured to the top of and closing the buffer zone, and a terminal plug secured to and carried in contact with one conductor and with a terminal pin secured in said terminal plug by an insulator and in contact with the other conductor.

19. The igniter for timed engine ignition as set forth in claim 11, wherein the interior cross sectional area of the ignition chamber means is varied from its entry passage to its closed end, thereby controlling the spring rate of the elastic gasses compressed therein.

20. The igniter for timed engine ignition as set forth in claim 11, wherein the interior cross sectional area of the ignition chamber means is decreased from its entry passage to its closed end, thereby increasing the spring rate of the elastic gasses compressed therein.

21. The igniter for timed engine ignition as set forth in claim 11, wherein external control means increases and decreases the volume of the buffer zone.

22. A compression controlled igniter for timing chamber ignition in internal combustion engines having a combustion chamber, means for intake of a combustible fuel-air mixture, means for effecting a compression cycle followed by a power cycle, and means for exhaust of burnt gasses, and including;
an elongated ignition chamber means comprised of a timing zone with an entry passage in open communication with the combustion chamber and a buffer zone continuing from the timing zone and with a closed end to capture gasses therein,
igniter means comprised of a glow plug having a heater element exposed within the ignition chamber means between said entry passage and said closed end for ignition of a stratified pressure front of said combustible fuel-air mixture penetrating into the ignition chamber during the compression cycle,
the ignition chamber means being closed by said end to capture burnt gasses therein so as to function as a spring opposed to the pressure front of said combustible fuel-air mixture,
and a control means comprised of an externally operated valve opening the first mentioned buffer zone to a secondary buffer zone to augment the volume of the elastic gas spring,
whereby burnt gasses occlude the heater element until contacted by the penetrating stratified pressure front of combustible fuel-air mixture for ignition thereof and transfer of a flame into the combustion chamber to effect the power cycle.

23. The compression controlled igniter for timed engine ignition as set forth in claim 22, wherein the externally operated valve is a solenoid actuated poppet valve lifted thereby from a seat isolating the first mentioned and said secondary buffer zones.

24. An igniter for catalytically enhanced timing chamber ignition in internal combustion engines having a combustion chamber, means for intake of a combustible fuel-air mixture, means for effecting a compression cycle followed by a power cycle, and means for exhaust of burnt gasses, and including;
an elongated ignition chamber means comprised of a timing prechamber zone with a catalyst therein and an entry passage in open communication with the combustion chamber for the transfer of a stratified compression front of the combustible fuel-air mixture from the combustion chamber and over the catalyst and preactivating the same, and a buffer zone continuing from the timing zone and with a closed end to capture gasses therein,
igniter means comprised of a rod carried by the closed end of the ignition chamber means and having a heater element exposed within the ignition chamber means between said entry passage and said closed end for ignition of a stratified pressure front of said preactivated combustible fuel-air mixture penetrating through the ignition chamber during the compression cycle,
the ignition chamber means being closed by said end to capture burnt gasses therein so as to function as a spring opposed to the pressure front of said combustible fuel-air mixture,
whereby burnt gasses occlude the heater element until contacted by the penetrating stratified pressure front of preactivated combustible fuel-air mixture initiating an ignition phase thereof and the transfer of an enhanced flame emanating into the combustion chamber to effect the power cycle.

25. The igniter for enhanced timed engine ignition as set forth in claim 24, wherein the ignition chamber means is a ceramic of tubular crosssection carried by a metalic body adapted to the engine combustion chamber.

26. The igniter for enhanced timed engine ignition as set forth in claim 24, wherein the ignition chamber means is a ceramic heat control means of tubular cross section carried by a metalic body adapted to the engine combustion chamber.

27. The igniter for enhanced timed engine ignition as set forth in claim 24, wherein the ignition chamber means is a ceramic heat control means of tubular cross section carried by and projecting from a metalic body screw threaded into the engine for exposure into the combustion chamber.

28. The igniter for enhanced timed engine ignition as set forth in claim 24, wherein the catalyst is a deposite of material within the timing prechamber and extending below the heater element of the igniter means.

29. The igniter for enhanced timed engine igntion as set forth in claim 24, wherein the catalyst is a deposite of material within the timing prechamber and surrounding and extending below the heater element of the igniter means.

30. The igniter for enhanced timed engine ignition as set forth in claim 24, wherein the catalyst is a sleeve of material inserted within the timing prechamber and extending below the heater element of the ignition means.

31. The igniter for enhanced timed engine ignition as set forth in claim 24, wherein the catalyst is a deposite of material within the timing prechamber and surrounding and extending below the heater element of the igniter means.

32. The igniter for enhanced timed engine ignition as set forth in claim 25, wherein the catlyst is a deposite of material within the timing prechamber and extending below the heater element of the igniter means.

33. The igniter for enhanced timed engine ignition as set forth in claim 25, wherein the catalyst is a deposite of material within the timing prechamber and surrounding and extending below the heater element of the igniter means.

34. The igniter for enchanced timed engine ignition as set forth in claim 25, wherein the catalyst is a sleeve of material inserted within the timing prechamber and extending below the heater elements of the ignition means.

35. The igniter for enhanced timed engine ignition as set forth in claim 25, wherein the catalyst is a deposite of material within the timing prechamber and surrounding and extending below the heater element of the igniter means.

* * * * *